United States Patent
Nagatani

(10) Patent No.: US 9,841,664 B2
(45) Date of Patent: Dec. 12, 2017

(54) COOLING DEVICE AND PROJECTOR THAT CHANGES PRESSURE AND CIRCULATION SPEED OF A COOLING GAS BASED ON A DETERMINED PRESSURE OF THE COOLING GAS

(71) Applicant: Seiko Epson Corporation, Tokyo (JP)

(72) Inventor: Kaname Nagatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/122,041

(22) PCT Filed: Mar. 16, 2015

(86) PCT No.: PCT/JP2015/001450
§ 371 (c)(1),
(2) Date: Aug. 26, 2016

(87) PCT Pub. No.: WO2015/141213
PCT Pub. Date: Sep. 24, 2015

(65) Prior Publication Data
US 2017/0214892 A1    Jul. 27, 2017

(30) Foreign Application Priority Data

Mar. 17, 2014 (JP) ................................ 2014-054053
Feb. 10, 2015 (JP) ................................ 2015-024462

(51) Int. Cl.
*G03B 21/16* (2006.01)
*H04N 9/31* (2006.01)
(Continued)

(52) U.S. Cl.
CPC .............. *G03B 21/16* (2013.01); *F25B 21/02* (2013.01); *G03B 21/204* (2013.01);
(Continued)

(58) Field of Classification Search
CPC ..... G03B 21/16; G03B 21/2026; H01J 61/52; F21V 29/02; F21V 29/83; F04B 43/026
See application file for complete search history.

(56) References Cited

U.S. PATENT DOCUMENTS

| 5,813,233 A | 9/1998 | Okuda et al. |
| 2006/0232973 A1 | 10/2006 | Haga et al. |

(Continued)

FOREIGN PATENT DOCUMENTS

| JP | 8-63261 A | 3/1996 |
| JP | 2001-355937 A | 12/2001 |

(Continued)

OTHER PUBLICATIONS

International Search Report, International Application No. PCT/JP2015/001450, dated Jun. 16, 2015.

(Continued)

*Primary Examiner* — Sultan Chowdhury
*Assistant Examiner* — Magda Cruz
(74) *Attorney, Agent, or Firm* — ALG Intellectual Property, LLC

(57) ABSTRACT

A cooling device that can maintain or improve a cooling ability without being affected by fluctuation in an ambient temperature. Gas is supplied to a cooling target to cool the cooling target. A cooling device includes a cooling gas including gas having thermal conductivity higher than the thermal conductivity of the air, a partition wall that closes and stores the cooling target and the cooling gas and is capable of circulating the cooling gas, a cooling section that cools and circulates the cooling gas, a pressure determining section that determines the pressure of the cooling gas, and a cooling control section that controls the cooling section. The cooling control section causes the cooling section to change the pressure of the cooling gas and/or change the (Continued)

circulation speed of the cooling gas on the basis of a result of the determination of the pressure determining section.

19 Claims, 5 Drawing Sheets

(51) Int. Cl.
    *F25B 21/02*     (2006.01)
    *G03B 21/20*     (2006.01)

(52) U.S. Cl.
    CPC ......... *G03B 21/208* (2013.01); *H04N 9/3144* (2013.01); *H04N 9/3155* (2013.01); *H04N 9/3191* (2013.01); *F25B 2321/0212* (2013.01); *F25B 2321/0251* (2013.01); *F25B 2600/11* (2013.01); *F25B 2700/19* (2013.01); *F25B 2700/2104* (2013.01)

(56) References Cited

U.S. PATENT DOCUMENTS

2009/0290130 A1* 11/2009 Nishimura ............. G03B 21/16
                                                                       353/52

2011/0115992 A1   5/2011   Maeda et al.
2011/0242499 A1  10/2011  Terao

FOREIGN PATENT DOCUMENTS

| JP | 2005-121250 | | 5/2005 |
| --- | --- | --- | --- |
| JP | 2005-121250 | A | 5/2005 |
| JP | 2008-90062 | A | 4/2008 |
| JP | 2009-075236 | | 4/2009 |
| JP | 2011-081528 | A | 4/2011 |
| JP | 2012-078707 | A | 4/2012 |
| JP | 2013-253747 | A | 12/2013 |

OTHER PUBLICATIONS

European Search Report issued in related Patent Application No. EP-15764562, dated Jun. 28, 2017.

* cited by examiner

COOLING DEVICE AND PROJECTOR THAT CHANGES PRESSURE AND CIRCULATION SPEED OF A COOLING GAS BASED ON A DETERMINED PRESSURE OF THE COOLING GAS

CROSS-REFERENCE TO RELATED APPLICATIONS

This application is the U.S. National Phase under 35 U.S.C. §371 of International Application No. PCT/JP2015/001450 filed on Mar. 16, 2015, which in turn claims the benefit of Japanese Application No. 2014-054053 filed on Mar. 17, 2014, and Japanese Application No. 2015-024462 filed on Feb. 10, 2015, the disclosures of which are expressly incorporated by reference herein.

TECHNICAL FIELD

The present invention relates to a cooling device and a projector.

BACKGROUND ART

In a projector, a large number of components that generate heat and are susceptible to the heat such as a light source lamp and a liquid crystal panel are used. It is important for maintenance of functions of the projector to appropriately cool the components. Therefore, a cooling system that performs cooling of constituent components is provided in a housing of the projector.

As the cooling system, there is a cooling system in which a thermoelectric conversion element (a heat transfer element), a circulation fan, and an optical component such as a liquid crystal panel serving as a cooling target are disposed in a closed space and the air in the closed space is circulated by the circulation fan to cool the cooling target (see, for example, JP-A-2005-121250).

As the thermoelectric conversion element in the cooling system, a Peltier element that transfers heat according to application of a voltage is used. As the Peltier element, a heat absorbing section is disposed in the closed space to transfer the heat of the air in the closed space to a heat radiating section disposed outside the closed space. That is, in the cooling system, the air in the closed space is cooled by the thermoelectric conversion element and the cooled air is supplied to the cooling target by the circulation fan to cool the cooling target and the air is circulated in the closed space.

SUMMARY

The circulated air used in the projector fluctuates according to fluctuation in the ambient temperature (the environmental temperature) of the projector. When the temperature of the circulated air fluctuates, the pressure of the circulated air also fluctuates. In particular, when the pressure of the circulated air drops, it is likely that blowing performance of the circulation fan is deteriorated and heat transfer between the circulated air and the thermoelectric conversion element cannot be sufficiently secured.

Further, in the projector of JP-A-2005-121250, even if airtightness of the closed space is spoiled and a gas leak occurs, there is no means for detecting the gas leak. Therefore, it is likely that the liquid crystal panel and the like of the projector are not sufficiently cooled and deficiencies occur in the projector.

An object of the present invention is to propose a cooling device and a projector that can maintain or improve a cooling ability without being affected by fluctuation in an ambient temperature (an environmental temperature).

A cooling device according to a first implementation mode of the present invention is a cooling device that supplies gas to a cooling target and cools the cooling target, the cooling device including: a cooling gas including gas having thermal conductivity higher than the thermal conductivity of the air; a partition wall that closes and stores the cooling target and the cooling gas and is capable of circulating the cooling gas; a cooling section that cools and circulates the cooling gas; a pressure determining section that determines the pressure of the cooling gas; and a cooling control section that controls the cooling section, wherein the cooling control section causes the cooling section to change the pressure of the cooling gas and/or change the circulation speed of the cooling gas on the basis of a result of the determination of the pressure determining section. That is, the cooling control section causes the cooling section to perform at least one of the change of the pressure of the cooling gas or the change the circulation speed of the cooling gas on the basis of the determination result of the pressure determining section.

According to the present invention, when the pressure of the cooling gas including the gas having the thermal conductivity higher than the thermal conductivity of the air fluctuates according to fluctuation in an ambient temperature (an environmental temperature), the cooling control section can control the cooling section on the basis of a result of the determination of the pressure determining section. Therefore, it is possible to adjust the pressure of the cooling gas such that the thermal conductivity of the cooling gas does not fluctuate. Therefore, it is possible to maintain high cooling efficiency.

A cooling device according to a second implementation mode of the present invention is characterized in that, in the first implementation mode, the pressure of the cooling gas is higher than the atmospheric pressure.

The cooling device is characterized in that, in the first implementation mode or the second implementation mode, the cooling gas is a helium gas.

According to the present invention, since the helium gas having the thermal conductivity higher than the thermal conductivity of the air is used as the cooling gas, cooling efficiency is improved.

A cooling device according to a fourth implementation mode of the present invention is characterized in that, in any one of the first to third implementation modes, when a pressure drop of the cooling gas is determined by the pressure determining section, the cooling control section controls the cooling section to raise the pressure of the cooling gas and/or increase the circulation speed of the cooling gas. That is, the cooling control section controls the cooling section to perform at least one of the raising of the pressure of the cooling gas and the increase of the circulation speed of the cooling gas.

According to the present invention, the cooling control section causes the cooling section to perform at least one of the raising of the pressure of the cooling gas and the increase of the circulation speed of the cooling gas such that the thermal conductivity of the cooling gas does not decrease. Therefore, it is possible to prevent a situation in which the pressure of the cooling gas drops because of the influence of the environmental temperature and the thermal conductivity of the cooling gas drops. Therefore, it is possible to maintain high cooling efficiency.

A cooling device according to a fifth implementation mode of the present invention is characterized in that, in any one of the first to fourth implementation modes, the partition wall is formed of a metal material.

According to the present invention, since the thermal conductivity of the partition wall increases, it is possible to increase a heat quantity emitted to the outside via the partition wall.

A cooling device according to a sixth implementation mode of the present invention is characterized in that, in any one of the first to fourth implementation modes, the cooling section includes: a thermoelectric conversion element, a heat absorbing section of which is exposed to the inside of the partition wall and a heat radiating section of which is exposed to the outside of the partition wall; and a circulation fan that circulates the cooling gas on the inside of the partition wall.

According to the present invention, it is possible to drive the thermoelectric conversion element to adjust the temperature of the cooling gas and drive the circulation fan to adjust the flow velocity (the flow rate) of the cooling gas. Therefore, the thermal conductivity of the cooling gas is improved. It is possible to realize high cooling efficiency.

A cooling device according to a seventh implementation mode of the present invention is characterized in that, in the sixth implementation mode, the cooling control section controls to drive the thermoelectric conversion element on the basis of the determination result of the pressure determining section.

According to the present invention, the cooling control section controls the voltage application to the thermoelectric conversion element on the basis of the determination result of the pressure determining section. Consequently, it is possible to perform the temperature adjustment of the cooling gas and realize high cooling efficiency.

A cooling device according to an eighth implementation mode of the present invention is characterized in that, in any one of the first to fourth implementation modes, the cooling section includes: a heat absorbing section exposed to the inside of the partition wall; a transfer section that transfers heat absorbed by the heat absorbing section to the outside of the partition wall via a coolant; and a circulation fan that circulates the cooling gas on the inside of the partition wall.

According to the present invention, the heat absorbed by the heat absorbing section is transferred to the outside of the partition wall via the coolant. Therefore, it is possible to adjust a heat absorption amount in the heat absorbing section by adjusting a flow amount of the coolant.

A cooling device according to a ninth implementation mode of the present invention is characterized in that, in any one of the first to eighth implementation modes, the pressure determining section includes: a pressure measuring section that measures the pressure of the cooling gas; and a temperature measuring section that measures the temperature of the cooling gas, and the pressure determining section calculates pressure of the cooling gas from a measurement value of the temperature measuring section and, when a difference between a value of the calculation and the measurement value of the pressure measuring section is not within a predetermined range, determines that the cooling gas leaks from the partition wall.

According to the present invention, it is possible to easily and surely determine the leak of the cooling gas from a relation between the pressure and the temperature of the cooling gas. Therefore, it is possible to find, at an early stage, a situation in which the cooling efficiency is deteriorated by the leak of the cooling gas.

A projector according to a first implementation mode of the present invention is a projector including: a light source; an optical device that modulates, according to image information, a light beam emitted from the light source to form an optical image; and a projection optical system that enlarges and projects the optical image formed by the optical device, wherein the projector includes the cooling device according to any one of the first to ninth implementation modes of the present invention.

According to the present invention, since the cooling device having high cooling efficiency is used, it is possible to sufficiently cool components susceptible to heat such as a light source. Therefore, it is possible to prevent occurrence of deficiencies of the projector for a long period.

A projector according to a second implementation mode of the present invention is characterized in that, in the first implementation mode, the cooling device cools the optical device.

According to the present invention, it is possible to prevent occurrence of deficiencies such as color unevenness in the optical device for a long period.

A projector according to a third implementation mode of the present invention is characterized in that, in the first implementation mode or the second implementation mode, the optical device includes a light modulating device, and the cooling device cools the light modulating device.

According to the present invention, it is possible to prevent occurrence of deficiencies such as color unevenness in the light modulating device for a long period.

A projector according to a fourth implementation mode of the present invention is characterized in that, in any one of the first to third implementation modes, the optical device includes an illumination optical device that equalizes the light beam emitted from the light source, and the cooling device cools the illumination optical device.

According to the present invention, it is possible to prevent occurrence of deficiencies involved in a temperature rise of the illumination optical device for a long period.

A projector according to a fifth implementation mode of the present invention is characterized in that, in any one of the first to fourth implementation modes, the projector further includes: a laser beam source functioning as the light source; and a fluorescent optical device that is included in the optical device and excites fluorescent light with light emitted from the laser beam source, and the cooling device cools the fluorescent optical device.

According to the present invention, it is possible to prevent occurrence of deficiencies involved in a temperature rise of the fluorescent optical device for a long period.

A projector according to a sixth implementation mode of the present invention is characterized in that, in any one of the first to fifth implementation modes, when the pressure determining section of the cooling device determines that the cooling gas leaks, the pressure determining section notifies information corresponding to a result of the determination.

According to the present invention, it is possible to smoothly detect the leak of the cooling gas.

A projector according to a seventh implementation mode of the present invention is characterized in that, in any one of the first to sixth implementation modes, when the pressure determining section of the cooling device determines that the cooling gas leaks, the pressure determining section suppresses brightness of the light source.

According to the present invention, it is possible to lower the temperature of the optical device.

DESCRIPTION OF EXEMPLARY EMBODIMENTS

A cooling device and a projector according to a first embodiment of the present invention are explained with reference to the drawings.

Figure 1:
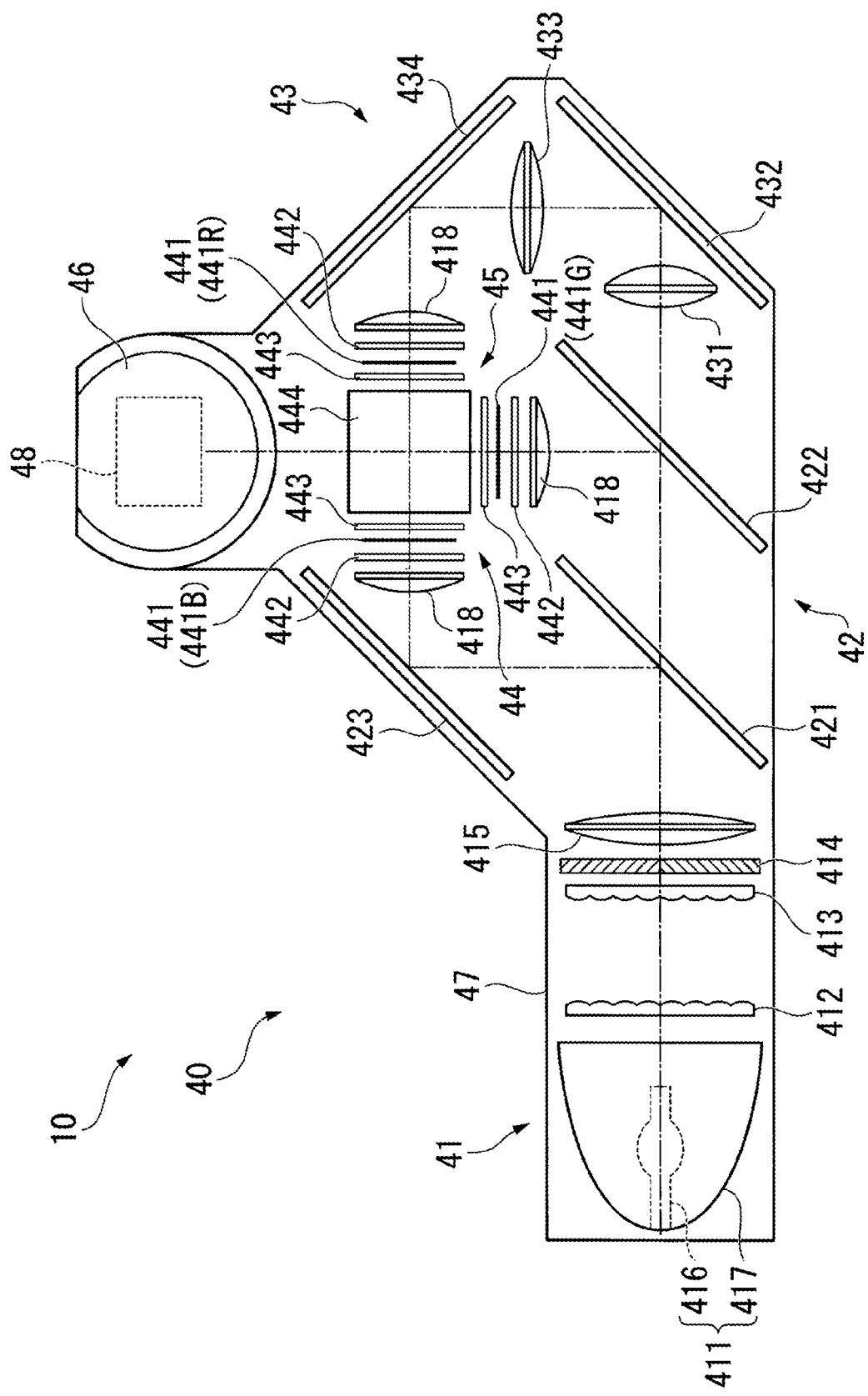
FIG. 1 is a diagram schematically showing an optical unit 40 of a projector 10 according to a first embodiment of the present invention.

FIG. 1 is a diagram schematically showing an optical unit 40 of a projector 10 according to a first embodiment of the present invention.

The projector 10 is a rear projector that modulates, according to image information, a light beam emitted from a light source to form an optical image and enlarges and projects the optical image on a screen.

The projector 10 includes a cabinet (not shown in the figure), a screen, a mirror, and the optical unit 40.

The screen (not shown in the figure) is provided to be exposed on the front surfaced of the cabinet. The mirror (not shown in the figure) and the optical unit 40 are disposed on the inside of the cabinet.

Figure 2:
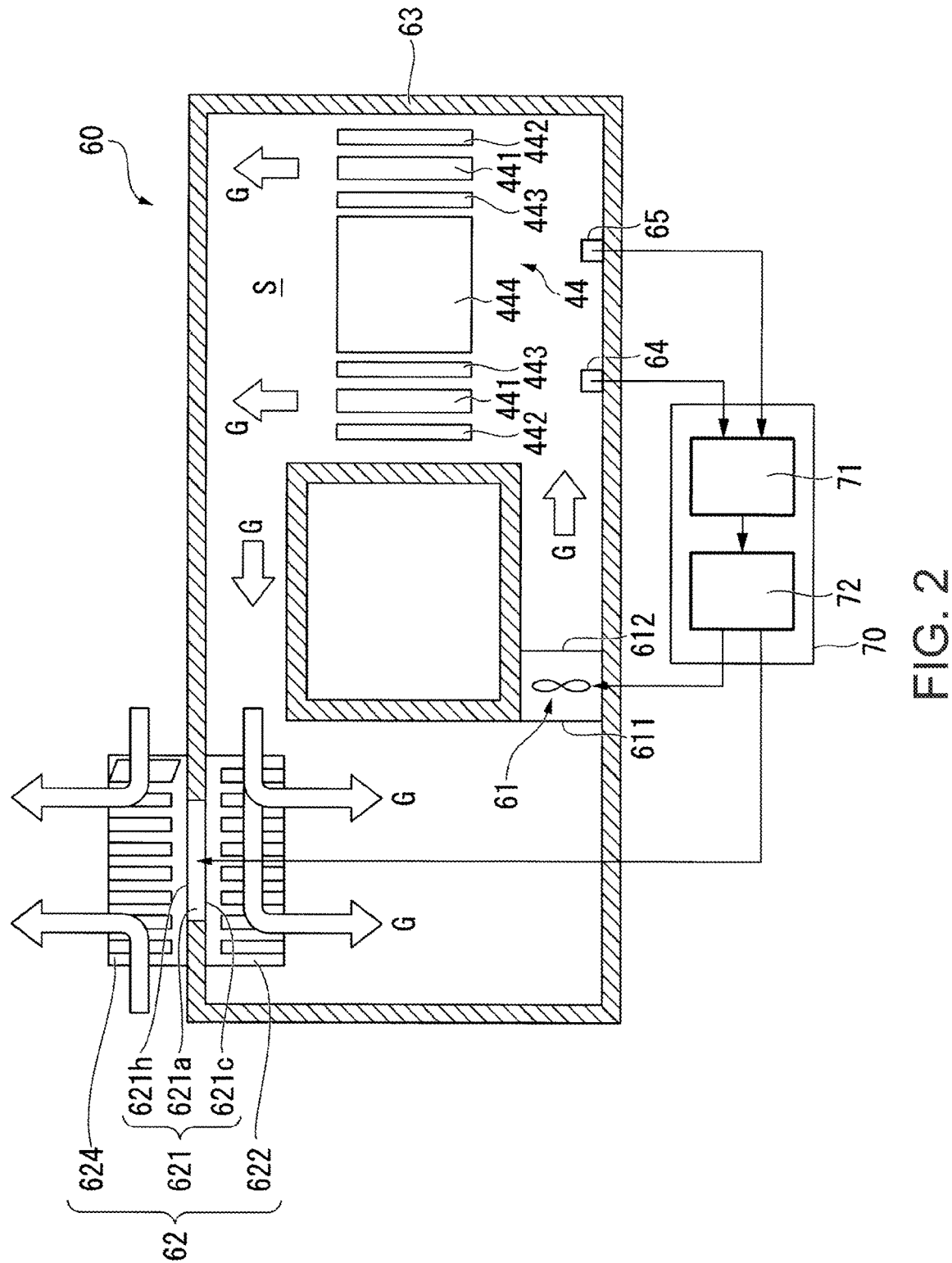
FIG. 2 is a diagram schematically showing a cooling device 60 according to the first embodiment of the present invention.

Further, as shown in FIG. 2, the projector 10 includes a power supply device (not shown in the figure), a cooling device 60, and a control device 70 as well.

The power supply device (not shown in the figure) supplies electric power received from the outside to the optical unit 40 and the like. The cooling device 60 cools constituent components of the optical unit 40.

The control device 70 carries out, for example, driving control of the optical unit 40 according to image information input from the outside. The control device 70 controls to drive the cooling device 60.

Optical Unit

FIG. 1 is a diagram schematically showing the optical unit 40.

The optical unit 40 is a unit that optically processes a light beam emitted from a light source lamp configuring a light source device to form an optical image corresponding to image information and enlarges and projects the optical image.

The optical unit 40 includes an integrator illumination optical device 41, a color separation optical system 42, a relay optical system 43, an optical device 44, a prism 48, a projection lens 46, and a light guide 47.

The integrator illumination optical system (a light source) 41 is an optical system for substantially uniformly illuminating image forming regions of three liquid crystal panels (light modulating devices) 441.

The integrator illumination optical device 41 includes a light source device 411, a first lens array 412, a second lens array 413, a polarization conversion element 414, and a superimposing lens 415.

The light source device 411 includes a light source lamp 416 and a reflector 417. The light source device 411 reflects, with the reflector 417, a radial beam emitted from the light source lamp 416 to change the radial ray to a parallel beam and emits the parallel beam to the outside.

A halogen lamp is adopted as the light source lamp 416. Besides the halogen lamp, a metal halide lamp, a high-pressure mercury lamp, and the like can also be adopted.

A parabolic mirror is adopted as the reflector 417. Instead of the parabolic mirror, a mirror obtained by combining a collimating concave lens and an ellipsoidal mirror may be adopted.

The first lens array 412 has a configuration in which small lenses having a substantially rectangular contour when viewed from an optical axis direction are arrayed in a matrix shape. The small lenses divide a light beam emitted from the light source lamp 416 into a plurality of partial light beams.

The second lens array 413 has a configuration substantially the same as the configuration of the first lens array 412. The second lens array 413 has a configuration in which small lenses are arrayed in a matrix shape. The second lens array 413 has a function of, in conjunction with the superimposing lens 415, focusing images of the small lenses of the first lens array 412 on the liquid crystal panels 441.

The polarization conversion element 414 is disposed between the second lens array 413 and the superimposing lens 415. The polarization conversion element 414 is integrated with the second lens array 413 as a unit.

The polarization conversion element 414 converts lights from the second lens array 413 into substantially one kind of polarized light. Consequently, efficiency of use of lights in the optical device 44 is improved. Specifically, partial lights converted into substantially one kind of polarized light by the polarization conversion element 414 are finally substantially superimposed on the liquid crystal panels 441 of the optical device 44 by the superimposing lens 415.

In the projector 10, the liquid crystal panels 441 of a type for modulating polarized light are used. In the projector 10, since only one kind of polarized light can be used, substantially a half of lights from the light source lamp 416, which emits other kinds of random polarized light, is not used. Therefore, by using the polarization conversion element 414, a light beam emitted from the light source lamp 416 is converted into substantially one kind of polarized light to improve efficiency of use of lights in the optical device 44.

The polarization conversion element 414 is introduced in, for example, JP-A-8-304739.

The color separation optical system 42 includes two dichroic mirrors 421 and 422 and a reflecting mirror 423.

The color separation optical system 42 has a function of separating, with the dichroic mirrors 421 and 422, a plurality of partial light beams emitted from the integrator illumination optical device 41 into color lights of three colors of red (R), green (G), and blue (B).

The relay optical system 43 includes an incident-side lens 431, a relay lens 433, and reflecting mirrors 432 and 434. The relay optical system 43 has a function of leading the red light, which is the color light separated by the color separation optical system 42, to a liquid crystal panel 441R for red light of the optical device 44.

In this case, in the dichroic mirror 421 of the color separation optical system 42, a red light component and a green light component of a light beam emitted from the integrator illumination optical device 41 are transmitted and a blue light component is reflected. The blue light reflected by the dichroic mirror 421 is reflected on the reflecting mirror 423, passes through a field lens 418, and reaches a liquid crystal panel 441B for blue light of the optical device 44. The field lens 418 converts partial light beams emitted from the second lens array 413 into light beams parallel to a center axis (a main optical axis) of the partial light beams.

The field lenses 418 provided on light beam incident sides of other liquid crystal panels 441G and 441R for green light and for red light are the same.

Of the red light and the green light transmitted through the dichroic mirror 421, the green light is reflected by the dichroic mirror 422, passes through the field lens 418, and reaches the liquid crystal panel 441G for green light.

On the other hand, the red light is transmitted through the dichroic mirror 422, passes through the relay optical system 43, and further passes through the field lens 418, and reaches the liquid crystal panel 441R for red light.

The relay optical system 43 is used for the red light in order to prevent deterioration in efficiency of use of light due to diffusion and the like of light because the length of an optical path of the red light is larger than the optical path lengths of the other color lights. That is, the relay optical system 43 is used in order to directly transmit a partial light beam made incident on the incident-side lens 431 to the field lens 418.

The relay optical system 43 is configured to allow the red light among the three color lights to pass. However, the relay optical system 43 is not limited to this. For example, the relay optical system 43 may be configured to allow the blue light to pass.

The optical device (the cooling target) 44 modulates, according to image information, a light beam made incident thereon to form a color image. The optical device 44 includes three incident-side polarizing plates 442, three liquid crystal panels 441, three emission-side polarizing plates 443, and a cross dichroic prism 444.

The color lights separated by the color separation optical system 42 are made incident on the three incident-side polarizing plates 442.

The three liquid crystal panels 441 (441R, 441G, and 441B) are light modulating devices disposed at post stages of the incident-side polarizing plates 442.

The three emission-side polarizing plates 443 are disposed at post stages of the liquid crystal panels 441.

The cross dichroic prism 444 is a color combination optical device.

The liquid crystal panels 441 (441R, 441G, and 441B) are, for example, liquid crystal panels in which polysilicon TFTs are used as switching elements. In the optical device 44, the color lights separated by the color separation optical system 42 are modulated according to image information by the three liquid crystal panels 441R, 441G, and 441B, the incident-side polarizing plates 442, and the emission-side polarizing plates 443 to form optical images.

The incident-side polarizing plates 442 transmit only polarized lights in fixed directions among the color lights separated by the color separation optical system 42 and absorb the other light beams. The incident-side polarizing plates 442 are formed by sticking polarizing films to substrates of sapphire glass or the like.

The emission-side polarizing plates 443 are configured substantially the same as the incident-side polarizing plates 442. The emission-side polarizing plates 443 transmit only polarized lights in predetermined directions among light beams emitted from the liquid crystal panels 441 and absorb the other light beams.

The directions of polarization axes of the incident-side polarizing plates 442 and the emission-side polarizing plates 443 are set to be orthogonal to each other.

The cross dichroic prism 444 combines optical images emitted from the emission-side polarizing plates 443 and modulated for each of the color lights to form a color image.

In the cross dichroic prism 444, a dielectric multilayer film for reflecting the red light and a dielectric multilayer film for reflecting the blue light are provided in a substantially X shape along interfaces of four right-angle prisms. The three color lights are combined by the dielectric multiplayer films of the cross dichroic prism 444.

The liquid crystal panels 441, the emission-side polarizing plates 443, and the cross dichroic prism 444 configure the optical device 44. The optical device 44 is integrally formed as a unit and the optical device main body 45 is formed.

The prism 48 is disposed on a light beam emission side of the optical device 44. The prism 48 bends and reflects the color image formed by the optical device 44 in a direction of the projection lens 46 (i.e., bends and reflects the color image emitted to the forward direction to the upward direction).

The projection lens (the projection optical system) 46 enlarges the color image reflected on the prism 48 and projects the color image on a mirror. The projection lens 46 is configured as a lens unit in which a plurality of lenses are housed in a lens barrel.

The light guide 47 is configured from synthetic resin and houses and holds the optical systems 41 to 45 and 48. The light guide 47 includes a lower light guide and an upper light guide.

In the lower light guide, groove sections in which the optical components 412 to 415, 418, 421 to 423, and 431 to 434 are fit from above in a sliding manner are formed. The upper light guide is formed in a lid shape for closing an opening side of an upper part of the lower light guide.

In an upper part and a lower part of the light guide 47, openings corresponding to the optical device 44 are formed. The openings are connected to a partition wall 63 of the cooling device.

[Cooling Device]

FIG. 2 is a diagram schematically showing the cooling device 60.

The cooling device 60, which mainly cools the optical device 44, is provided on the inside of the projector 10.

In the cooling device 60, the optical device 44 is disposed in a space surrounded by the partition wall 63. A cooling gas G encapsulated in the space is circulated to cool the optical device 44. That is, a channel of the cooling gas G is formed on the inside of the cooling device 60.

As the cooling gas G, a helium gas (0.14 to 0.16 W/m/k (at 20° C. time)) having thermal conductivity higher than the thermal conductivity of the air (0.026 W/m/k (at 20° C. time)) is adopted.

The cooling device 60 includes an axial fan 61, a cooling unit 62, and the partition wall 63.

The axial fan (a cooling section, a circulation fan) 61 blows the cooling gas G to the optical device 44. The cooling unit 62 cools the cooling gas G to be sucked by the axial fan 61. The partition wall 63 closes and houses the optical device 44 and the axial fan 61.

The partition wall 63 forms a closed space S on the inside. The axial fan 61 and the optical device 44 are closed and housed on the inside of the closed space S. In the closed space S of the partition wall 63, the cooling gas G is encapsulated to be capable of circulating.

The partition wall 63 is formed by a heat insulating material. The inside and the outside of the closed space S are thermally insulated. As the heat insulating material, materials having low thermal conductivity such as cloth, paper, plastic, felt, rubber, cement, glass fiber, styrene foam, asbestos, and cork can be adopted.

The partition wall 63 may be configured to be formed of a metal material having high thermal conductivity such as aluminum, copper, and brass.

The axial fan 61 blows the cooling gas G to the optical device 44 and circulates the cooling gas G encapsulated in the closed space S. In the axial fan 61, an air intake surface 611 is disposed on the cooling unit 62 side and a discharge surface 612 is disposed on the optical device 44 side.

The cooling unit 62 is a unit for cooling the cooling gas G supplied to the optical device 44 by the axial fan 61. The cooling unit 62 is configured to include a Peltier element 621.

As the Peltier element (a cooling section, a thermoelectric conversion element) 621, a Peltier element of a π type is adopted. In the Peltier element 621, a P-type semiconductor element and an N-type semiconductor element are alternately disposed between a pair of heat exchanger plates disposed to be opposed to each other. On semiconductor element contact surfaces of the pair of heat exchanger plates, wiring patterns for alternately connecting the P-type and N-type semiconductor elements in series are formed.

When a voltage is applied to a voltage application terminal 621a of the Peltier element 621, the heat of one heat exchanger plate of a joining surface flows to the other heat exchanger plate. That is, a heat absorbing section 621c has action of absorbing heat and a heat radiating section 621h has action of radiating heat. Therefore, the heat absorbing section 621c cools the cooling gas G supplied to the axial fan 61 and the heat radiating section 621h radiates heat absorbed from the cooling gas G.

The heat radiating section 621h is exposed to the outdoor air and naturally cooled.

The heat absorbing section 621c is exposed to the closed space S formed by the partition wall 63. A heat sink 622 is also housed in the closed space S.

The heat sink 622 is a fin-like member that projects from the heat absorbing section 621c and promotes heat exchange of the cooling gas G that is in contact with the heat sink 622. The heat sink 622 is provided to cover the heat absorbing section 621c. It is possible to efficiently cool the cooling gas G by increasing an area of the contact with the cooling gas G.

The heat radiating section 621h of the Peltier element 621 is exposed to the outer side of the closed space S of the partition wall 63. In the heat radiating section 621h, as in the heat absorbing section 621c, a heat sink 624 is provided.

The cooling of the cooling gas G in the heat absorbing section 621c is promoted by increasing an area of contact with the cooling gas G and promoting cooling of the heat radiating section 621h with the heat sink 624 that promotes heat exchange.

A pressure sensor 64 and a temperature sensor 65 are provided in the closed space S of the partition wall 63.

The pressure sensor (a pressure measuring section) 64 is provided in, for example, a space between the discharge surface 612 of the axial fan 61 and the optical device 44 and measures the pressure of the cooling gas G.

The temperature sensor (a temperature measuring section) 65 is provided in, for example, the space between the discharge surface 612 of the axial fan 61 and the optical device 44 and measures the temperature of the cooling gas G.

The pressure sensor 64 and the temperature sensor 65 are connected to an input side of the control device 70.

The voltage application terminal 621a of the Peltier element 621 and the axial fan 61 are connected to an output side of the control device 70.

The control device 70 controls to drive the cooling device 60.

The control device 70 includes a pressure/temperature determining section 71 and a cooling control section 72.

The pressure/temperature determining section (a pressure determining section) 71 determines the pressure and the temperature of the cooling gas G from measurement signals of the pressure sensor 64 and the temperature sensor 65.

The cooling control section 72 controls to drive the axial fan 61 and the Peltier element 621 on the basis of a result of the determination of the pressure/temperature determining section 71.

The control device 70 controls the cooling device 60 to cool the optical device 44 as explained below.

The control device 70 performs operation adjustment for the axial fan 61 and the Peltier element 621 on the basis of the measurement signals of the pressure sensor 64 and the temperature sensor 65.

In the closed space S of the partition wall 63, the cooling gas G comes into contact with the heat sink 622 attached to the heat absorbing section 621c of the Peltier element 621 and heat exchange is performed, whereby the heat of the cooling gas G is absorbed and the cooling gas G is cooled. The cooling gas G flows toward the air intake surface 611 of the axial fan 61.

The axial fan 61 sucks the cooling gas G from the air intake surface 611 and discharges the cooling gas G toward the optical device 44 from the discharge surface 612. The cooling gas G discharged by the axial fan 61 is blown to a lower part of the optical device 44 and flows upward to cool the optical device 44.

The cooling gas G flows toward the heat sink 622 of the heat absorbing section 621c of the Peltier element 621 again.

When the pressure/temperature determining section 71 determines that a measurement value of the temperature sensor 65 (the temperature of the cooling gas G) is higher than an optimum operation temperature of the optical device 44, the cooling control section 72 increases a voltage applied to the voltage application terminal 621a of the Peltier element 621.

Consequently, a temperature gradient between the heat absorbing section 621c and the heat radiating section 621h increases. The cooling of the cooling gas G in the heat absorbing section 621c is promoted. A heat exchange amount per unit time is increased to intensely cool the optical device 44 by increasing electric energy supplied to the axial fan 61, intensifying the blowing to the optical device 44, and increasing circulation speed of the cooling gas G.

On the other hand, when the pressure/temperature determining section 71 determines that the measurement value of the temperature sensor 65 (the temperature of the cooling gas G) is lower than the optimum operation temperature of the optical device 44, the cooling control section 72 suppresses the application of the voltage to the voltage application terminal 621a.

Consequently, the temperature gradient between the heat absorbing section 621c and the heat radiating section 621h is reduced to suppress the cooling of the cooling gas G. A power supply amount to the axial fan 61 is reduced to suppress a blowing amount as well.

However, when the temperature of the cooling gas G drops, since the cooling gas G is encapsulated in the closed space S of the partition wall 63 and the volume of the cooling gas G does not change, the pressure of the cooling gas G drops. Therefore, the thermal conductivity of the cooling gas G also drops according to the pressure drop.

Therefore, when the Peltier element 621 and the like are controlled on the basis of only the measurement value of the temperature sensor 65, it is likely that the cooling of the optical device 44 becomes insufficient to the contrary.

Therefore, the control device 70 (the cooling control section 72) controls the Peltier element 621 and the axial fan 61 taking into account a measurement value of the pressure sensor 64 (the pressure of the cooling gas G) as well.

That is, when the measurement value of the pressure sensor 64 (the pressure of the cooling gas G) drops, the cooling control section 72 raises the pressure of the cooling gas G. The cooling control section 72 desirably maintains the thermal conductivity of the cooling gas G fixed not to decrease.

Specifically, the cooling control section 72 weakens a voltage applied to the voltage application terminal 621a. Consequently, the cooling of the cooling gas G in the heat absorbing section 621c is suppressed, the temperature drop of the cooling gas G is suppress, and the temperature is maintained fixed. The electric energy supplied to the axial fan 61 is increased, the blowing to the optical device 44 is intensified, and the circulation speed of the cooling gas G is increased.

Consequently, the drop of the thermal conductivity of the cooling gas G is suppressed. It is possible to avoid a situation in which the cooling of the optical device 44 becomes insufficient.

Further, the control device 70 (the pressure/temperature determining section 71) detects a leak of the cooling gas G (a gas leak) from the partition wall 63 (the closed space S) on the basis of the measurement values of the temperature sensor 65 and the pressure sensor 64. This is for the purpose of determining whether the pressure drop of the cooling gas G is due to the temperature drop of the cooling gas G or due to the gas leak from the partition wall 63.

The cooling gas G is encapsulated in the closed space S of the partition wall 63 and the volume of the cooling gas G does not change. Therefore, the pressure/temperature determining section 71 can calculate the temperature of the cooling gas G from the measurement value of pressure sensor 64 by applying the Boyle-Charle's law.

The pressure/temperature determining section 71 compares a calculation value (a calculated temperature) calculated from the measurement value of the pressure sensor 64 and the measurement value (the measured temperature) of the temperature sensor 65 to thereby determine presence or absence of a gas leak.

That is, when a difference between the calculation value of the pressure sensor 64 and the measurement value of the temperature sensor 65 is within a predetermined range, the pressure/temperature determining section 71 determines that the gas leak is absent. On the other hand, when the difference between the calculation value of the pressure sensor 64 and the measurement value of the temperature sensor 65 exceeds the predetermined range (is not within the predetermined range), the pressure/temperature determining section 71 determines that the gas leak is present.

When determining that the gas leak is present, the pressure/temperature determining section 71 displays warning information on a screen or sounds an alarm. In this way, the pressure/temperature determining section 71 informs a user of the projector 10 of occurrence of a deficiency of the cooling device 60.

When determining that the gas leak is present, the pressure/temperature determining section 71 may change the operation of the projector. For example, the pressure/temperature determining section 71 may suppress the brightness of the light source to thereby lower the temperature of an image forming element.

[Effects]

With the cooling device 60 of the projector 10, effects explained below can be achieved.

When the pressure of the cooling gas G fluctuates according to fluctuation in an ambient temperature (an environmental temperature), the control device 70 controls the axial fan 61 and the Peltier element 621 on the basis of a result of the determination of the pressure sensor 64. Therefore, in this embodiment, it is possible to adjust the pressure of the cooling gas G such that the thermal conductivity of the cooling gas G does not fluctuate.

Specifically, the control device 70 raises the pressure of the cooling gas G such that the thermal conductivity of the cooling gas G does not drop. Therefore, in this embodiment, it is possible to prevent a situation in which the pressure of the cooling gas G drops because of the influence of the environmental temperature and the thermal conductivity of the cooling gas G drops.

Therefore, the cooling device 60 can maintain high cooling efficiency.

In this embodiment, since the helium gas having the thermal conductivity higher than the thermal conductivity of the air is used as the cooling gas G, the cooling efficiency is improved. Since the axial fan 61 and the Peltier element 621 are included as the cooling section, in this embodiment, it is possible to drive the Peltier element 621 to adjust the temperature of the cooling gas G and drive the axial fan 61 to adjust the flow velocity (the flow rate) of the cooling gas G. Therefore, in this embodiment, the thermal conductivity of the cooling gas G is improved and it is possible to realize high cooling efficiency.

Further, in this embodiment, it is possible to easily and surely determine a leak of the cooling gas G by comparing the measurement value of the pressure sensor 64 and the calculation value of the temperature sensor 65. Therefore, in this embodiment, it is possible to find, at an early stage, a situation in which the cooling efficiency is deteriorated by the leak of the cooling gas G.

In this embodiment, since the liquid crystal panels 441 can be sufficiently cooled by the cooling device 60, it is possible to prevent deficiencies such as color unevenness for a long period.

[Second Embodiment]

A cooling device and a projector according to a second embodiment are explained with reference to FIG. 3. Components same as the components in the first embodiment shown in FIG. 1 and FIG. 2 are denoted by the same reference numerals and signs and explanation of the components is omitted.

In the first embodiment, the configuration in which the cooling section includes the Peltier element 621 is illustrated. However, in the second embodiment, a configuration in which the cooling section includes a radiator is explained.

Figure 3:
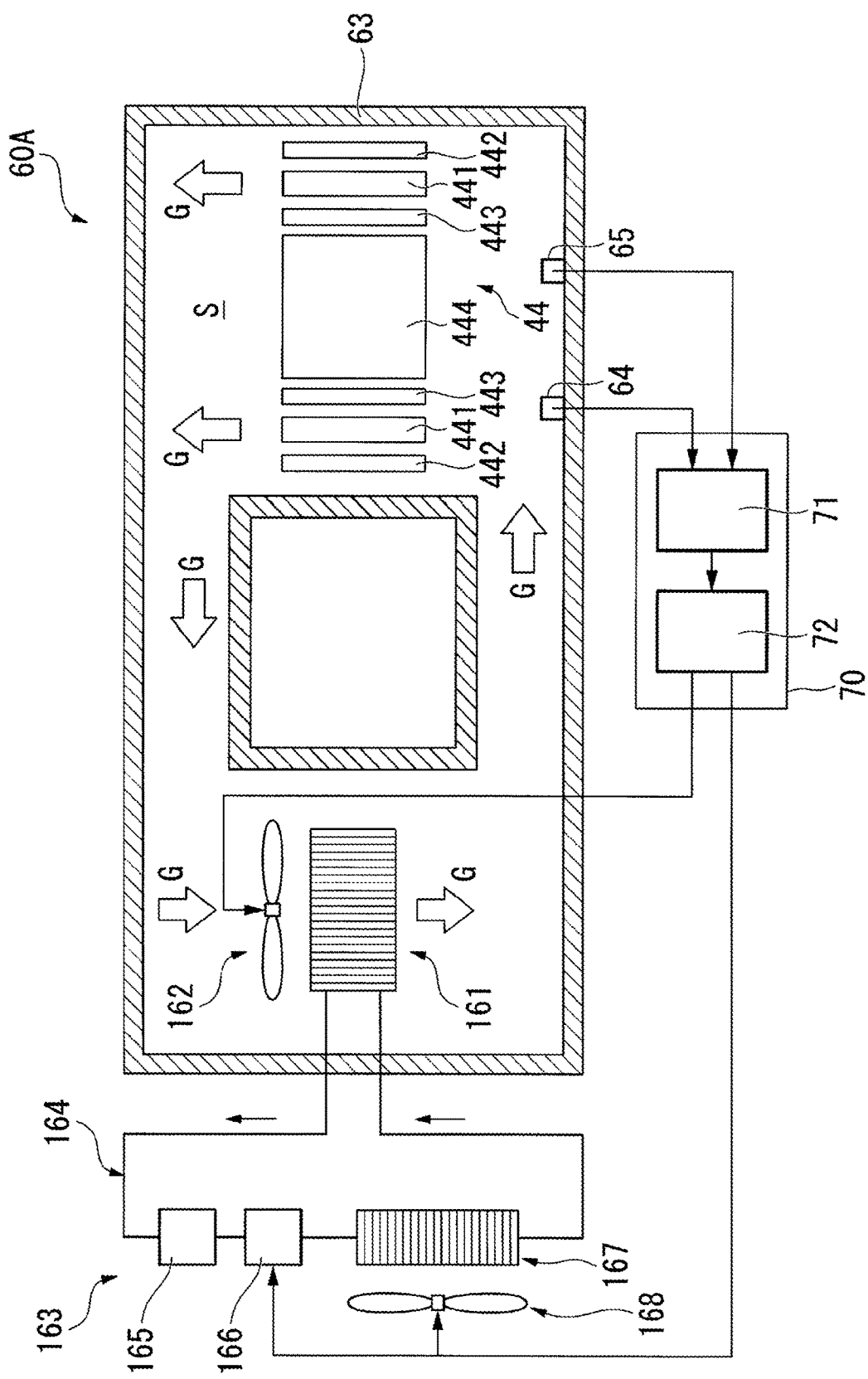
FIG. 3 is a diagram schematically showing a cooling device 60A according to a second embodiment of the present invention.

As shown in FIG. 3, a cooling device 60A according to this embodiment includes a radiator (a heat absorbing section) 161, a circulation fan 162, and a transfer section 163. The radiator 161 is provided to be exposed to the inside of the partition wall 63. The circulation fan 162 is provided to be opposed to the radiator 161 on the inside of the partition wall 63. The circulation fan 162 blows the cooling gas G toward the radiator 161.

The transfer section 163 transfers heat absorbed by the radiator 161 to the outside of the partition wall 63. The transfer section 163 includes a pipe 164, a tank 165, a pump 166, a radiator for heat radiation 167, and a fan for heat radiation 168. The pipe 164 is connected to the radiator 161. The pipe 164 forms a circulation path through which a heated coolant is discharged from the radiator 161 and a cooled coolant is supplied to the radiator 161. As the coolant, fluid of liquid or gas is used. As the coolant of the liquid, various coolants such as water and HFE (hydrofluoroether) can be used.

In the following explanation, a side on which the coolant is discharged from the radiator 161 is referred to as upstream side as appropriate and a side on which the coolant is supplied to the radiator 161 is referred to as downstream side as appropriate.

In the pipe 164, the tank 165, the pump 166, and the radiator for heat radiation 167 are sequentially interposed from the upstream side. The tank 165 stores the coolant heated by heat exchange with the cooling gas G. The pump 166 feeds the coolant stored in the tank 165 to the downstream side according to the control by the cooling control section 72. The radiator for heat radiation 167 cools, under the control by the cooling control section 72, through heat exchange with the air, the coolant fed from the upstream side. The fan for heat radiation 168 is provided to be opposed to the radiator for heat radiation 167. The fan for heat radiation 168 blows the cooling gas G toward the radiator for heat radiation 167 to thereby promote heat radiation of the coolant in the radiator for heat radiation 167.

In the cooling device 60A having the configuration explained above, when the pressure/temperature determining section 71 determines that the measurement value of the temperature sensor 65 (the temperature of the cooling gas G) is higher than the optimum operation temperature of the optical device 44, the cooling control section 72 controls the driving of the pump 166, the circulation fan 162, and the fan for heat radiation 168, increases a flow amount of the coolant, and increases a blowing amount to the radiator 161 and the radiator for heat radiation 167.

Consequently, a heat absorption amount in the radiator 161 increases and the cooling of the cooling gas G in the radiator 161 is promoted. Since the circulation speed of the cooling gas G on the inside of the partition wall 63 increases, a heat exchange amount per unit time increases and it is possible to intensely cool the optical device 44.

On the other hand, when the pressure/temperature determining section 71 determines that the measurement value of the temperature sensor 65 (the temperature of the cooling gas G) is lower than the optimum operation temperature of the optical device 44, the cooling control section 72 controls the driving of the pump 166, the circulation fan 162, and the fan for heat radiation 168, reduces the flow amount of the coolant, and reduces the blowing amount to the radiator 161 and the radiator for heat radiation 167. At this point, as in the first embodiment, the control device 70 controls the driving of the pump 166, the circulation fan 162, and the fan for heat radiation 168 taking into account the measurement value of the pressure sensor 64 (the pressure of the cooling gas G) as well.

That is, when the measurement value of the pressure sensor 64 (the pressure of the cooling gas G) drops, the cooling control section 72 raises the pressure of the cooling gas G. The cooling control section 72 desirably maintains the thermal conductivity of the cooling gas G fixed not to decrease.

Specifically, the cooling control section 72 controls the driving of the pump 166 and the fan for heat radiation 168 to reduce the flow amount of the coolant and reduce the blowing amount to the radiator for heat radiation 167. Consequently, the cooling of the cooling gas G in the radiator 161 is suppressed and the temperature drop of the cooling gas G is suppressed. The cooling control section 72 controls the driving of the circulation fan 162 to intensify the blowing to the optical device 44 and increase the circulation speed of the cooling gas G.

Consequently, the drop of the thermal conductivity of the cooling gas G is suppressed. It is possible to avoid a situation in which the cooling of the optical device 44 becomes insufficient.

In this way, in this embodiment, action and effects same as the action and the effects in the first embodiment are obtained. In addition, the radiator 161 is provided on the inside of the partition wall 63 and the driving of the pump 166 and the fan for heat radiation 168 provided on the outside of the partition wall 63 is controlled. Therefore, it is possible to exhibit a high cooling ability. In this embodiment, the flow amount of the coolant by the control of the pump 166 and the blowing amount to the radiator for heat radiation 167 by the control of the fan for heat radiation 168 are individually independently adjusted. Consequently, it is possible to finely adjust the heat absorption amount in the radiator 161, that is, the temperature of the cooling gas G.

[Third Embodiment]

A cooling device and a projector according to a third embodiment are explained with reference to FIG. 4 and FIG. 5. In the figures, components same as the components in the second embodiment shown in FIG. 3 are denoted by the same reference numerals and signs and explanation of the components is omitted.

In this embodiment, a laser beam source is used as a light source. A fluorescent optical device that excites fluorescent light with light emitted from the laser beam source is cooled.

Figure 4:
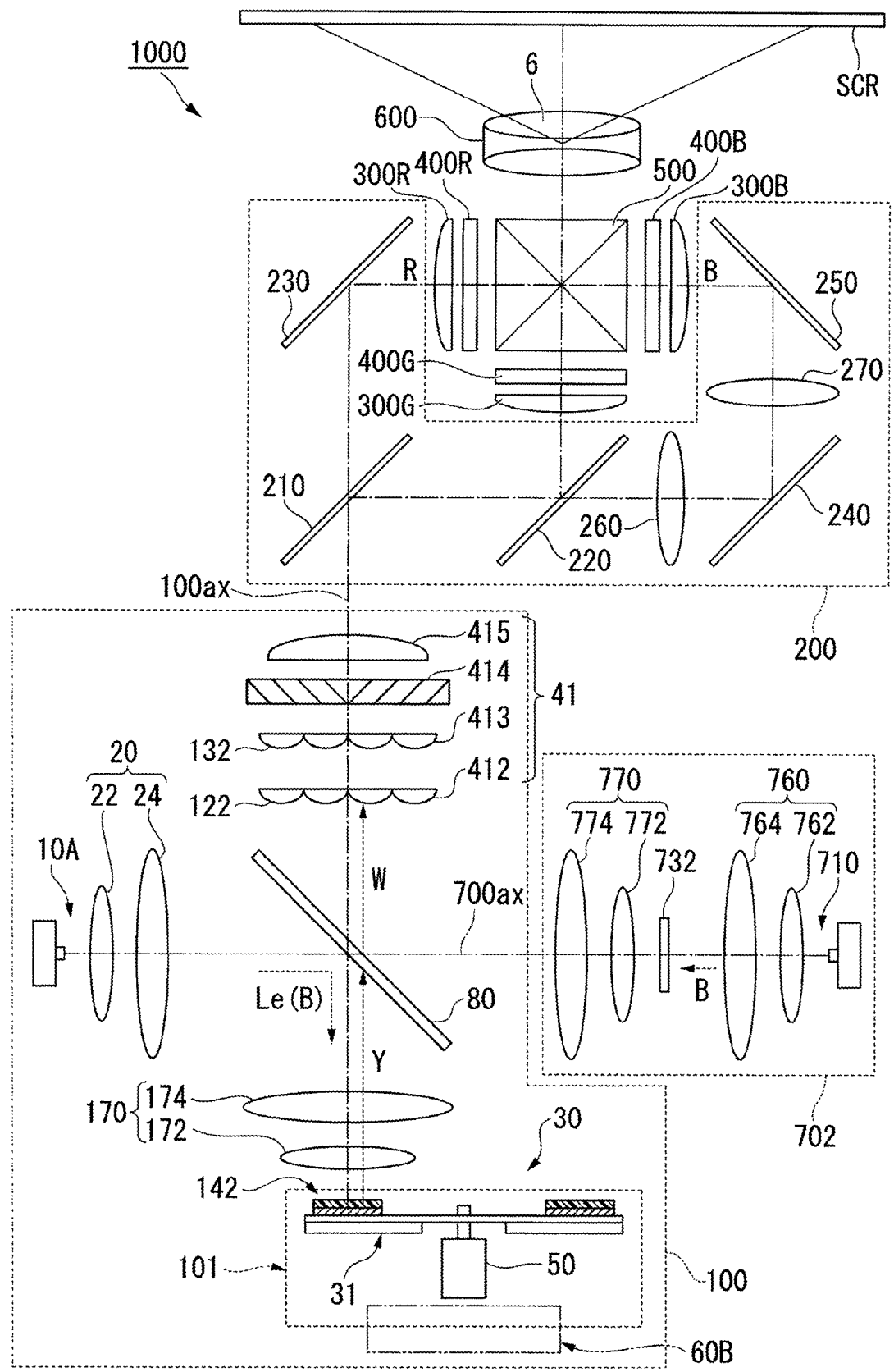
FIG. 4 is a top view showing an optical system of a projector 1000 according to a third embodiment.

FIG. 4 is a top view showing an optical system of a projector 1000 according to the third embodiment.

The projector 1000 includes, as shown in FIG. 4, a first illumination device 100, a color separation/light guide optical system 200, liquid crystal light modulating devices 400R, 400G, and 400B, a cross dichroic prism 500, a projection optical system 600, and a second illumination device 702.

The first illumination device 100 includes a first solid-state light source device 10A, a collimate/condensing optical system 20, a rotating fluorescent plate 30, a motor 50, a dichroic mirror 80, a collimate/condensing optical system 170, and the integrator illumination optical device 41. The first solid-state light source device 10 is disposed such an optical axis is orthogonal to an illumination optical axis 100ax. The first solid-state light source device 10 consists of a laser light source that emits blue light, which is formed by a laser beam, as excitation light Le. The first solid-state light source device 10A emits blue light, a peak of light emission intensity of which is approximately 445 nm, as the excitation light Le.

The collimate/condensing optical system 20 includes a first lens 22 and a second lens 24 and substantially collimates light from the first solid-state light source device 10A. The first lens 22 and the second lens 24 consists of convex lenses. The dichroic mirror 80 is disposed in an optical path from the collimate/condensing optical system 20 to the collimate/condensing optical system 170 to cross each of the optical axis of the first solid-state light source device 10A and the illumination optical axis 100ax at an angle of 45°. The dichroic mirror 80 reflects blue light and allows red light and green light to pass.

The collimate/condensing optical system 170 has a function of making the excitation light Le from the dichroic mirror 80 incident on a phosphor layer 142 in a state in which the excitation light Le is substantially condensed and a function of substantially collimating fluorescent light emitted from the rotating fluorescent plate. The collimate/condensing optical system 170 includes a first lens 172 and a second lens 174. The first lens 172 and the second lens 174 consist of convex lenses.

The rotating fluorescent plate 30 emits yellow light (fluorescent light) including the red light and the green light toward a side same as a side on which the blue light (the excitation light) is made incident by irradiation of the excitation light Le. The rotating fluorescent plate 30 is rotatable by the motor 50. The phosphor layer 142 is provided in the rotating fluorescent plate 30. The plane shape of the phosphor layer 142 is an annular shape. That is, the phosphor layer 142 is provided in a belt shape. In the embodiment, the phosphor layer 142 is excited by the blue light, the wavelength of which is approximately 445 nm. The phosphor layer 142 converts the excitation light Le, that is, blue light B from the first solid-state light source device 10A into yellow light Y including red light R and green light G. The rotating fluorescent plate 30 and the motor 50 are housed on the inside of a partition wall 101. In this embodiment, by rotating the rotating fluorescent plate 30 with the motor 50, it is possible to prevent heat due to irradiation of the excitation light Le from concentrating on one place.

Figure 5:
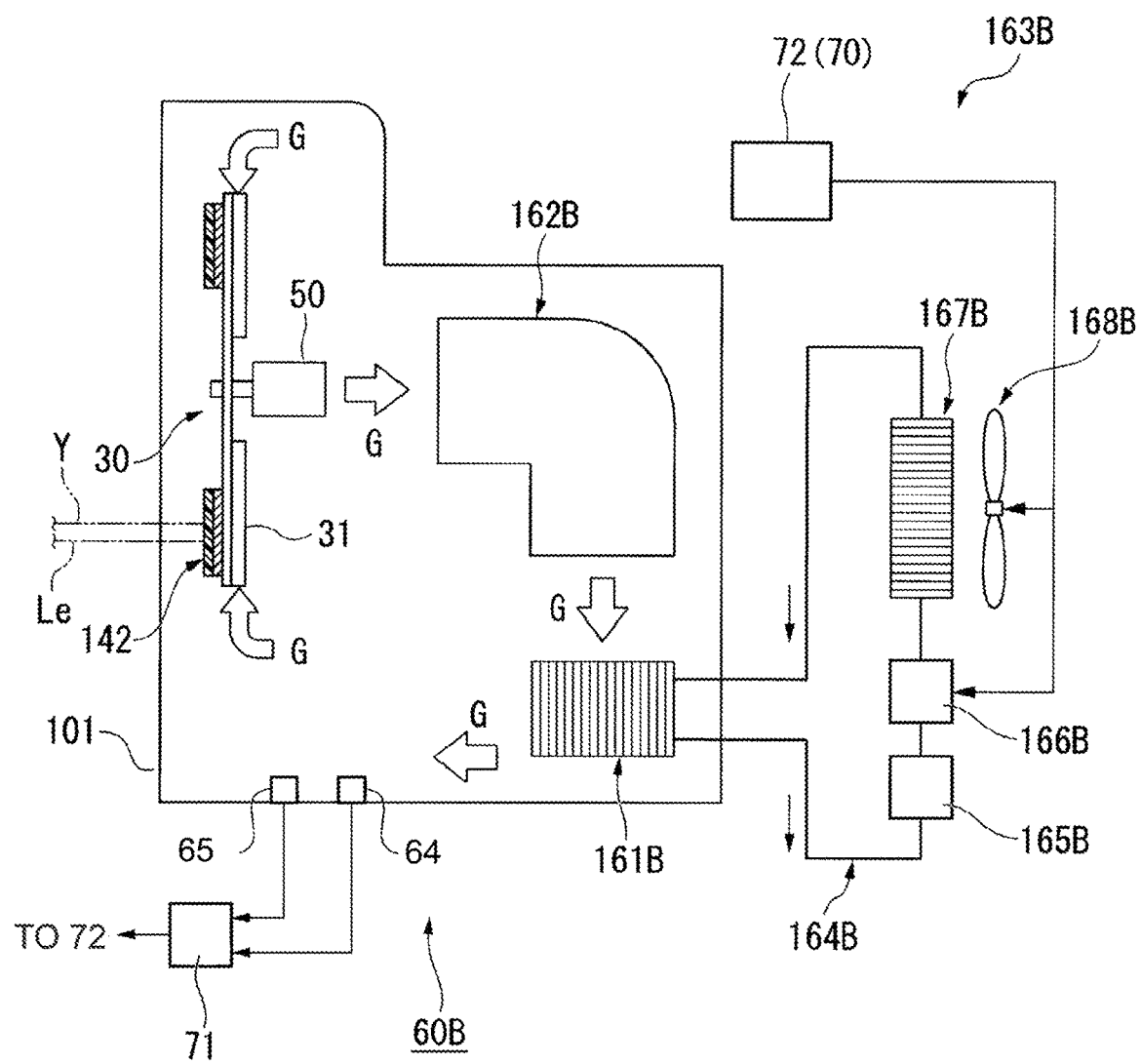
FIG. 5 is a schematic configuration diagram of a rotating fluorescent plate 30 and a motor 50 housed in a partition wall 101.

FIG. 5 is a schematic configuration diagram showing the rotating fluorescent plate 30 and the motor 50 housed in the partition wall 101. In this embodiment, a cooling device 60B that cools the rotating fluorescent plate 30 as a cooling target is provided. The cooling device 60B includes a radiator (a heat absorbing section) 161B, a sirocco fan (a circulation fan) 162B, a transfer section 163B, and a blade section 31.

The blade section 31 is provided on a side opposed to the sirocco fan 162B in the rotating fluorescent plate 30. When the rotating fluorescent plate 30 is rotated by the driving of the motor 50, the blade section 31 takes in the cooling gas G from the outer circumference side and blows the cooling gas G in the rotation axis direction of the rotating fluorescent plate 30. Therefore, the rotating fluorescent plate 30 functions as an axial fan when rotating.

The radiator 161B is provided to be exposed to the inside of the partition wall 101. The radiator 161B is disposed in a position opposed to a blowing port of the sirocco fan 162B. The sirocco fan 162B is provided on the inside of the partition wall 101 with a gas intake port opposed to the rotating fluorescent plate 30 and with the blowing port opposed to the radiator 161B.

The transfer section 163B transfers heat absorbed by the radiator 161B to the outside of the partition wall 101. The transfer section 163B includes a pipe 164B, a tank 165B, a pump 166B, a radiator for heat radiation 167B, and a fan for heat radiation 168B. The pipe 164B is connected to the radiator 161B. The pipe 164B forms a circulation path through which a heated coolant is discharged from the radiator 161B and a cooled coolant is supplied to the radiator 161B.

In the pipe 164B, the tank 165B, the pump 166B, and the radiator for heat radiation 167B are sequentially interposed from the upstream side. The tank 165B stores the coolant heated by heat exchange with the cooling gas G. The pump 166B feeds the coolant stored in the tank 165B to the downstream side according to the control by the cooling control section 72. The radiator for heat radiation 167B cools, under the control by the cooling control section 72, through heat exchange with the air around the coolant, the coolant fed from the upstream side. The fan for heat radiation 168B is provided to be opposed to the radiator for heat radiation 167B. The fan for heat radiation 168B blows the cooling gas G toward the radiator for heat radiation 167B to promote the heat radiation of the coolant in the radiator for heat radiation 167B.

Referring back to FIG. 4, the collimate/condensing optical system 170 includes the first lens 172 and the second lens 174 and substantially collimates light from the rotating fluorescent plate 30.

The integrator illumination optical device 41 includes the first lens array 412, the second lens array 413, the polarization conversion element 414, and the superimposing lens 415. The first lens array 412 includes a plurality of first small lenses 122 for dividing light from the collimate/condensing optical system 170 into a plurality of partial light beams. The plurality of first small lenses 122 are arrayed in a matrix shape within a plane orthogonal to the illumination optical axis 100ax. The second lens array 413 includes a plurality of second small lenses 132 corresponding to the plurality of first small lenses 122 of the first lens array 412. The second lens array 413 focuses, in conjunction with the superimposing lens 415, images of the first small lenses 122 of the first lens array 412 in the vicinities of image forming regions of the liquid crystal light modulating devices 400R 400G, and 400B. The plurality of second small lenses 132 are arrayed in a matrix shape within a plane orthogonal to the illumination optical axis 100ax.

The polarization conversion element 414 converts the partial light beams divided by the first lens array 412 into linear polarized light. The polarization conversion element 414 includes a polarization separation layer that directly transmits one liner polarization component of polarization components included in light from the rotating fluorescent plate 30 and reflects the other linear polarization component to a direction perpendicular to the illumination optical axis 100ax, a reflection layer that reflects the other linear polarization component reflected on the polarization separation layer to a direction parallel to the illumination optical axis 100ax, and a phase difference plate that converts the other linear polarization component reflected on the reflection layer into the one linear polarization component.

The superimposing lens 415 condenses the partial light beams from the polarization conversion element 414 and superimposes the partial light teams in the vicinities of the image forming regions of the liquid crystal light modulating devices 400R, 400G, and 400B. The first lens array 412, the second lens array 413, the polarization conversion element 414, and the superimposing lens 415 configure the integrator illumination optical device 41 that equalizes an in-plane light intensity distribution of light from the rotating fluorescent plate 30.

The second illumination device 702 includes a second solid-state light source device 710, a condensing optical system 760, a scattering plate 732, and a collimate optical system 770. The second solid-state light source device 710 is disposed to be opposed to the first solid-state light source device 10A across the illumination optical axis 100ax and disposed such that an optical axis 700ax is orthogonal to the illumination optical axis 100ax. The second solid-state light source device 710 is a laser beam source that emits, as color light, the blue light B formed by a laser beam, a peak of light emission intensity of which is approximately 445 nm.

The condensing optical system 760 includes a first lens 762 and a second lens 764. The condensing optical system 760 condenses the blue light B from the second solid-state light source device 710 near the scattering plate 732. The first lens 762 and the second lens 764 consist of convex lenses. The scattering plate 732 scatters the blue light from the second solid-state light source device 710 and changes the blue light into blue light having a light distribution similar to the light distribution of fluorescent light emitted from the rotating fluorescent plate 30. As the scattering plate 732, for example, ground glass consisting of optical glass can be used. The collimate optical system 770 includes a first lens 772 and a second lens 774 and substantially collimates lights from the scattering plate 732. The first lens 772 and the second lens 774 consist of convex lenses.

The color separation/light guide optical system 200 includes dichroic mirrors 210 and 220, reflecting mirrors 230, 240, 250, and relay lenses 260 and 270. The color separation/light guide optical system 200 separates light from the first illumination device 100 into red light, green light, and blue light and leads the red light, the green light, and the blue light to the liquid crystal light modulating devices 400R, 400G, and 400B corresponding to the red light, the green light, and the blue light. Condensing lenses 300R, 300G, and 300B are disposed between the color separation/light guide optical system 200 and the liquid crystal light modulating devices 400R, 400G, and 400B.

The dichroic mirror 210 is a dichroic mirror that allows a red light component to pass and reflects a green light component and a blue light component. The dichroic mirror 220 is a dichroic mirror that reflects the green light component and allows the blue light component to pass. The reflecting mirror 230 is a reflecting mirror that reflects the red light component. The reflecting mirrors 240 and 250 are reflecting mirrors that reflect the blue light component. The red light passed through the dichroic mirror 210 is reflected on the reflecting mirror 230, passes through the condensing lens 300R, and is made incident on the image forming region of the liquid crystal light modulating device 400R for red light. The green light reflected on the dichroic mirror 210 is further reflected on the dichroic mirror 220, passes through the condensing lens 300G, and is made incident on the image forming region of the liquid crystal light modulating device 400G for green light. The blue light passed through the dichroic mirror 220 is made incident on the image forming region of the liquid crystal light modulating device 400B through the relay lens 260, the reflecting mirror 240 on the incident side, the relay lens 270, the reflecting mirror 250 on the emission side, and the condensing lens 300B.

The liquid crystal light modulating devices 400R, 400G, and 400B modulate the incident color lights according to image information and form a color image. The cross dichroic prism 500 combines image lights emitted from the liquid crystal light modulating devices 400R, 400G, and 400B to form a color image. The cross dichroic prism 500 is formed in a substantially square shape in plan view obtained by sticking together four right-angle prisms. Dielectric multilayer films are formed on interfaces of a substantially X shape where the right-angle prisms are stuck together. The color image emitted from the cross dichroic prism 500 is enlarged and projected by the projection optical system 600 and forms an image on a screen SCR.

In the projector 1000, the rotating fluorescent plate 30 heated by the irradiation of the excitation light Le is cooled using the cooling device 60B having the configuration explained above.

Specifically, the rotating fluorescent plate 30 rotates, whereby the blade section 31 takes in the cooling gas G from the outer circumference side and blows the cooling gas G to the rotation axis direction of the rotating fluorescent plate 30. When the cooling gas G passes through the rotating fluorescent plate 30, heat exchange is performed between the cooling gas G and the rotating fluorescent plate 30 and the rotating fluorescent plate 30 is cooled. The cooling gas G heated by the heat exchange between the cooling gas G and the rotating fluorescent plate 30 is blown to the radiator 161B by the sirocco fan 162B. The cooling gas G cooled by the heat exchange with the radiator 161B is taken in from the outer circumference side by the impeller 31 and cools the rotating fluorescent plate 30.

On the other hand, the coolant in the radiator 161B heated by the heat exchange between the coolant and the cooling gas G is discharged via the pipe 164B and stored in the tank 165B. The coolant stored in the tank 165B is fed to the radiator for heat radiation 167B on the downstream side according to the control by the cooling control section 72. The radiator for heat radiation 167B cools, under the control by the cooling control section 72, through heat exchange between the coolant and the air around the coolant, the coolant fed from the upstream side. The fan for heat radiation 168B blows the cooling gas G toward the radiator for heat radiation 167B, whereby heat radiation of the coolant in the radiator for heat radiation 167B is promoted. The coolant cooled by the radiator for heat radiation 167B is supplied to the radiator 161B via the pipe 164B and served for cooling in the partition wall 101.

In the cooling device 60B having the configuration explained above, when the pressure/temperature determining section 71 determines that the measurement value of a temperature sensor 65 (the temperature of the cooling gas G) is higher than the optimum operation temperature, the cooling control section 72 controls the driving of the pump 166B, the sirocco fan 162B, and the fan for heat radiation 168B to increase a flow amount of the coolant and increase a blowing amount to the radiator 161B and the radiator for heat radiation 167B. Consequently, a heat absorption amount in the radiator 161B increases and the cooling of the cooling gas G in the radiator 161B is promoted. Since the circulation speed of the cooling gas G on the inside of the partition wall 101 increases, a heat exchange amount per unit time increases and it is possible to intensely cool the rotating fluorescent plate 30.

The technical scope of the present invention is not limited to the embodiment and can be variously changed without departing from the spirit of the invention.

For example, in the embodiments explained above, the helium gas is used as the cooling gas. However, the present invention is not limited to this. The cooling gas only has to be gas having thermal conductivity higher than the terminal conductivity of the air.

Besides, it is possible to replace the components in the embodiments with well-known components in a range not departing from the spirit of the present invention.

In the embodiments, the configuration is illustrated and explained in which both of the pressure of the cooling gas G and the circulation speed of the cooling gas G are changed by the control device 70 (cooling control section 72) on the basis of a result of the determination of the pressure/temperature determining section 71. However, a configuration may be adopted in which only the pressure of the cooling gas G or only the circulation speed of the cooling gas G is changed.

In the third embodiment, the configuration is illustrated in which the rotating fluorescent plate 30 in the projector 1000 is cooled using the cooling device 60B. However, the present invention is not limited to this. For example, a configuration may be adopted in which the illumination optical device (the integrator illumination optical device 41) that includes the first lens array 412, the second lens array 413, the polarization conversion element 414, and the superimposing lens 415 and equalizes the in-plane light intensity distribution of the light from the rotating fluorescent plate 30 is cooled. In this case, it is sufficient that the first lens array 412, the second lens array 413, the polarization conversion element 414, and the superimposing lens 415 are housed in a partition wall and the inside of the partition wall is cooled using the cooling device. As the cooling section, both of a configuration in which a Peltier element is used and a configuration in which a radiator is used can be adopted. Similarly, concerning the integrator illumination optical device 41 shown in FIG. 1 explained in the first embodiment and the second embodiment, it is sufficient that the first lens array 412, the second lens array 413, the polarization conversion element 414, and the superimposing lens 415 are housed in a partition wall and the inside of the partition wall is cooled using the cooling device.

In the embodiments, the closed space is provided for each cooling target. However, a plurality of cooling targets may be disposed in one closed space. In other words, in the embodiments, the configuration is illustrated in which one cooling target is cooled in one closed space. However, a configuration may be adopted in which a plurality of cooling targets are cooled in one closed space. A plurality of closed spaces corresponding to cooling targets may be provided in one projector 10 or 100. The configuration may be a configuration in which one cooling target is cooled in the closed spaces, a configuration in which a plurality of cooling targets are cooed in the closed spaces, or a configuration in which a closed space in which one cooling target is disposed and a closed space in which a plurality of cooling targets are disposed are mixed.

The invention claimed is:

1. A cooling device that supplies gas to a cooling target and cools the cooling target, the cooling device comprising:
a cooling gas including gas having thermal conductivity higher than the thermal conductivity of air;
a partition wall that closes and stores the cooling target and the cooling gas and is capable of circulating the cooling gas;
a cooling section that cools and circulates the cooling gas;
a pressure determining section that determines pressure of the cooling gas; and
a cooling control section that controls the cooling section, wherein
the cooling control section causes the cooling section to change the pressure of the cooling gas and/or change circulation speed of the cooling gas on the basis of a result of the determination of the pressure determining section.

2. The cooling device according to claim 1, wherein the pressure of the cooling gas is higher than an atmospheric pressure.

3. The cooling device according to claim 1, wherein the cooling gas is a helium gas.

4. The cooling device according to claim 2, wherein, when a pressure drop of the cooling gas is determined by the pressure determining section, the cooling control section controls the cooling section to raise the pressure of the cooling gas and/or increase the circulation speed of the cooling gas.

5. The cooling device according to claim 1, wherein the partition wall is formed of a metal material.

6. The cooling device according to claim 1, wherein the cooling section includes:
a thermoelectric conversion element, a heat absorbing section of which is exposed to an inside of the partition wall and a heat radiating section of which is exposed to an outside of the partition wall; and
a circulation fan that circulates the cooling gas on the inside of the partition wall.

7. The cooling device according to claim 6, wherein the cooling control section controls to drive the thermoelectric conversion element on the basis of the determination result of the pressure determining section.

8. The cooling device according to claim 1, wherein the cooling section includes:
a heat absorbing section exposed to an inside of the partition wall;
a transfer section that transfers heat absorbed by the heat absorbing section to an outside of the partition wall via a coolant; and
a circulation fan that circulates the cooling gas on the inside of the partition wall.

9. The cooling device according to claim 1, wherein the pressure determining section includes:
a pressure measuring section that measures the pressure of the cooling gas; and
a temperature measuring section that measures temperature of the cooling gas, and
the pressure determining section calculates temperature of the cooling gas from a measurement value of the temperature measuring section and, when a difference between a value of the calculation and the measurement value of the pressure measuring section is not within a predetermined range, determines that the cooling gas leaks from the partition wall.

10. The cooling device according to claim 9, wherein the pressure determining section compares the measurement value of the temperature measuring section and an optimum operation temperature of the cooling target and determines whether the measurement value is higher or lower than the optimum operation temperature, and
the cooling control section causes the cooling section to change the pressure of the cooling gas and/or change the circulation speed of the cooling gas on the basis of a result of the comparison and the measurement value of the pressure measuring section.

11. The cooling device according to claim 9, wherein the pressure measuring section is provided between the cooling section and the cooling target in a circulation channel of the cooling gas.

12. The cooling device according to claim 9, wherein the temperature measuring section is provided between the cooling section and the cooling target in a circulation channel of the cooling gas.

13. A projector comprising:
a light source;
an optical device that modulates, according to image information, a light beam emitted from the light source to form an optical image; and
a projection optical system that enlarges and projects the optical image formed by the optical device, wherein
the projector includes the cooling device according to claim 1.

14. The projector according to claim 13, wherein the cooling device cools the optical device.

15. The projector according to claim 13, wherein
the optical device includes a light modulating device, and
the cooling device cools the light modulating device.

16. The projector according to claim 13, wherein
the optical device includes an illumination optical device that equalizes the light beam emitted from the light source, and
the cooling device cools the illumination optical device.

17. The projector according to claim 13, further comprising:
a laser beam source functioning as the light source; and
a fluorescent optical device that is included in the optical device and excites fluorescent light with light emitted from the laser beam source, wherein
the cooling device cools the fluorescent optical device.

18. The projector according to claim 13, wherein, when the pressure determining section of the cooling device determines that the cooling gas leaks, the pressure determining section notifies information corresponding to a result of the determination.

19. The projector according to claim 13, wherein, when the pressure determining section of the cooling device determines that the cooling gas leaks, the pressure determining section suppresses brightness of the light source.

* * * * *